April 13, 1926.
F. W. SPERR, JR
1,580,451
MANUFACTURE OF HYDROGEN SULPHIDE
Original Filed April 4, 1921
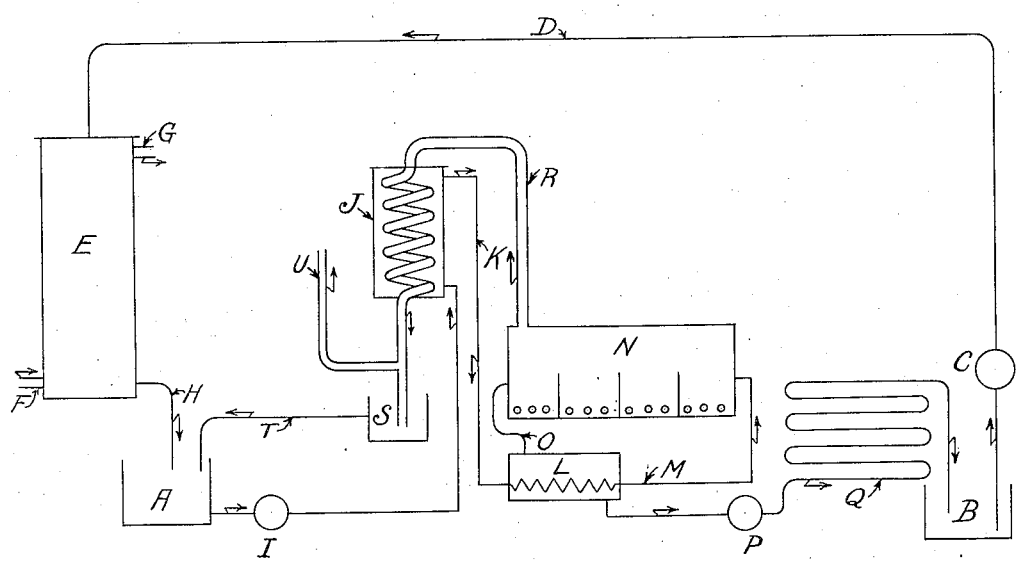
Inventor
Frederick W. Sperr, Jr.,
By: Munday Clarke + Carpenter
his Attorneys.

Patented Apr. 13, 1926.

1,580,451

UNITED STATES PATENT OFFICE.

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA.

MANUFACTURE OF HYDROGEN SULPHIDE.

Application filed April 4, 1921, Serial No. 458,367. Renewed July 3, 1925.

*To all whom it may concern:*

Be it known that I, FREDERICK W. SPERR, Jr., a citizen of the United States, residing in Pittsburgh, in the county of Allegheny and State of Pennsylvania, have invented a new and useful Improvement in Manufacture of Hydrogen Sulphide, of which the following is a specification.

This invention relates to the manufacture of hydrogen sulphide and has for an object to produce concentrated or pure hydrogen sulphide from gases which contain it. The gases to which my process is applicable are preferably those which contain a relatively small amount of carbon dioxide in proportion to the hydrogen sulphide. A typical example of such gases is the gas produced in the distillation and cracking of petroleum which may contain 5% or more of hydrogen sulphide by volume and little or no carbon dioxide. The process is, however, applicable to the treatment of other gases, such as coke oven gas, produced or treated in such a manner as to have a relatively low content of carbon dioxide. It is my purpose to treat these gases in such a way as to remove part or all of their hydrogen sulphide content and to recover the removed hydrogen sulphide in a concentrated form so that it may be utilized for any desired purpose, such as the manufacture of sulphuric acid.

In addition to the general object recited above, the invention has for further objects such other improvements or advantages in operation and results as are found to obtain in the apparatus and processes hereinafter described or claimed.

In the accompanying drawing, forming a part of this specification and showing, for purposes of exemplification, a preferred form and manner in which the invention may be embodied and practiced, but without limiting the claimed invention specifically to such illustrative instances, the figure illustrates a diagrammatic representation of apparatus for carrying out the improved process of the present invention.

As a medium for the removal of hydrogen sulphide from the gas, there may be employed a solution of an alkali-metal sulphide, which may be readily regenerated and used over and over again in a substantially continuous cycle of operation. According to the present embodiment of the invention, sodium sulphide ($Na_2S$) is employed, being a typical non-volatile alkali-metal sulphide, but it is understood that other non-volatile alkali-metal sulphides having similar reactive characteristics may be employed. When gas containing hydrogen sulphide is treaded with a solution of sodium sulphide, the hydrogen sulphide is absorbed and sodium hydrosulphide is formed according to the following equation:

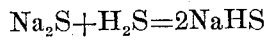

$$Na_2S + H_2S = 2NaHS$$

This absorption is preferably conducted at ordinary temperatures. When the resulting solution containing NaHS is heated, hydrogen sulphide is liberated and sodium sulphide formed by the reverse equation;

$$2NaHS = Na_2S + H_2S$$

The removal of the hydrogen sulphide may be accelerated by heating under vacuum or by passing air or other suitable gases, that act mechanically, through the solution. Sufficient removal of hydrogen sulphide for many practical purposes may be effected by simply aerating the solution at ordinary temperatures with air and other suitable gases, but such aeration may also be combined with heating.

The accompanying drawing shows one arrangement of apparatus for carrying out the process, although it is to be understood that many modifications and many other arrangements may be employed. In carrying out the invention, a solution of sodium sulphide containing, for example, 10% $Na_2S$. may be employed but other concentrations may be employed. This solution is placed in tank B and pumped by pump C through the pipe line D, over the scrubber E which may be any efficient type of gas scrubber. The gas containing hydrogen sulphide, such as petroleum distillate gas, passes into the scrubber at F and leaves at G with part or all of its hydrogen sulphide removed. The solution flows out of the scrubber through the pipe H into tank A from which it is pumped by pump I first through the heat exchanger and condenser J where it is preheated by the vapors from the heater N; thence, the partly preheated solution passes through pipe K into heat exchanger L where it is further preheated by the hot solution running from the heater N. The fully preheated solution passes through pipe M into the heater N. The heater N is provided with baffles to insure uniform distribution and flow and the heating may be effected by the steam coils shown, or by direct steam. The hot solution containing the regenerated sodium sulphide passes from the heater through pipe O into the heat exchanger L from which it is pumped by the pump P over cooler Q where it may be cooled by cold water or other means. The cooled solution runs into tank B from which it is circulated again over the scrubber E.

The steam and hydrogen sulphide from the heater N pass through pipe R and condenser J where they give up most of their heat to the incoming solution. The condensate from J may be caught in the trap S and returned to tank A through pipe T. The concentrated hydrogen sulphide passes out through pipe U and may be utilized in any way desired. In some cases, it is advantageous to operate the heater N under vacuum and this may readily be done by a suitable arrangement of apparatus.

The invention, as hereinabove set forth, may be variously embodied within the scope of the claims hereinafter made.

I claim:—

1. In a process of producing hydrogen sulphide, the combination of steps that consists in: passing a gas containing hydrogen sulphide through a sodium sulphide solution to absorb the hydrogen sulphide from the gas; subjecting preheated solution containing the absorbed hydrogen sulphide to a heating operation to liberate the hydrogen sulphide and to regenerate the solution; the solution going to the heating operation being preheated by passing it in heat exchanging relation with the liberated hydrogen sulphide and the regenerated solution; then cooling the regenerated solution and passing it back to the gas treatment stage; substantially as specified.

2. In a process of producing hydrogen sulphide, the combination of steps that consists in: passing a gas containing hydrogen sulphide through a non-volatile alkali-metal sulphide solution to absorb the hydrogen sulphide from the gas; subjecting preheated solution containing the absorbed hydrogen sulphide to a heating operation to liberate the hydrogen sulphide and to regenerate the solution; the solution going to the heating operation being preheated by passing it in heat exchanging relation with the liberated hydrogen sulphide and the regenerated solution; then cooling the regenerated solution and passing it back to the gas treatment stage; substantially as specified.

3. In a process of producing hydrogen sulphide, the combination of steps that consists in: passing a gas containing hydrogen sulphide through a non-volatile alkali-metal sulphide solution to absorb the hydrogen sulphide from the gas; subjecting preheated solution containing the absorbed hydrogen sulphide to a heating operation to liberate the hydrogen sulphide and to regenerate the solution; the solution going to the heating operation being preheated by passing it in countercurrent with material discharged from the regeneration operation; then cooling the regenerated solution and passing it back to the gas treatment stage; substantially as specified.

4. In a process of producing hydrogen sulphide, the combination of steps that consists in: passing a gas containing hydrogen sulphide through a non-volatile alkali-metal sulphide solution to absorb the hydrogen sulphide from the gas; and then recovering the hydrogen sulphide from such solution; substantially as specified.

5. In a process of producing hydrogen sulphide, the combination of steps that consists in: passing a gas containing hydrogen sulphide through a sodium sulphide solution to absorb the hydrogen sulphide from the gas; and then recovering the hydrogen sulphide from such solution, substantially as specified.

6. In a process of producing hydrogen sulphide, the combination of steps that consists in: passing a gas containing hydrogen sulphide through a non-volatile alkali-metal sulphide solution to absorb the hydrogen sulphide from the gas; and then subjecting the solution to a heating operation to liberate the hydrogen sulphide; substantially as specified.

7. In a process of producing hydrogen sulphide, the combination of steps that consists in: passing a gas containing hydrogen sulphide and relatively free from carbon dioxide through a non-volatile alkali-metal sulphide solution to absorb the hydrogen sulphide from the gas; and then recovering the absorbed hydrogen sulphide from such solution; substantially as specified.

In testimony whereof I have hereunto set my hand.

FREDERICK W. SPERR, Jr.